Patented May 24, 1927.

UNITED STATES PATENT OFFICE.

GEORGE W. RAIZISS, OF PHILADELPHIA, PENNSYLVANIA, ASSIGNOR TO THE ABBOTT LABORATORIES, OF CHICAGO, ILLINOIS, A CORPORATION OF ILLINOIS.

MANUFACTURE OF MERCURI-MONONITRO-ORTHO-CRESOL AND ITS SALTS.

No Drawing. Application filed May 25, 1923. Serial No. 641,502.

The object of my invention is to produce a mercury derivative of nitro-ortho-cresol, including the salts of such a derivative; and which, having succeeded in obtaining it, I have found to possess superior germicidal properties and hence having valuable therapeutic effects when such a remedy is indicated.

In the beginning of my researches and experiments to that end I found that in attempting to combine mercuric acetate with the nitro derivative of ortho cresol, the reaction desired would not take place with the dinitro derivative of ortho cresol, but only with the mono-nitro, and that there were no satisfactorily known methods of obtaining the latter in pure form. When the mono-nitro derivative is contaminated with the dinitro derivative, mercuric acetate will not combine. I therefore worked out the following satisfactory method for such purpose, and it forms the first step of my new process, as also the basic constituent of my new compound.

A given quantity of ortho cresol is nitrated by dissolving it in acetic acid, and adding to the solution nitric acid, dissolved in acetic acid, at a very low temperature, below 0°C. After the reaction is complete the mixture is diluted with water and permitted to stand over night at ordinary temperature. Any free nitric acid then found to be present in the container is then driven out by passing a rapid stream of nitrogen gas through the mixture. Then steam is injected and the pure mono-nitro compound comes over with the steam vapors, and as there is a constant tendency during the process of steam distillation to form the dinitro body, samples should be taken and examined microscopically about every half hour during the distillation process. The two bodies are finely crystalline in formation and readily recognized; the pure mono nitro body will be in the form of regular prisms, while the dinitro compound will appear as long needles.

The former only can be successfully used in forming a combination with mercuric acetate, at the latter—the impure or dinitro—will not combine therewith.

In proceeding to make my new ultimate compound, which may be characterized as an acetoxymercuri mono nitro ortho-cresol, the following example for producing the mono mercuric derivative may be given. Five grams of the mono 3-nitro ortho-cresol are dissolved in 100 c. c. of boiling water, to which is then added 10.2 grams of mercuric acetate dissolved in 50 c. c. of water with the addition of 3 to 5 drops of glacial acetic acid. After boiling for about 15 minutes, there is added a solution of sodium hydroxide, sufficient to leave a slight acidity. A formation of yellow crystals begins as the result of the reaction. The solution is then boiled for about 4 hours, then cooled, filtered, and the crystalline product after washing with water, methyl alcohol and ether, is then dried in vacuo over concentrated sulfuric acid. The product is yellow in color; soluble in sodium hydroxide; sparingly soluble in hot water; does not melt at 300° C., but will decompose at this temperature. The following structural formula would represent it.

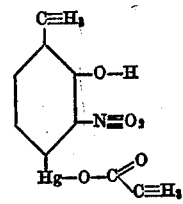

A water soluble derivative of this compound may be made by suspending a quantity of it in hot water to which sodium hydroxide is added until dissolved. The solution is then concentrated, and cooled, sufficiently to show beginning of crystal formation. Cooling is then continued until crystallization is complete. These appear as very minute crystals in the form of long prisms, when examined under a microscope and are reddish brown in color. This water soluble derivative of my new compound last above described is soluble in hot water and in methyl alcohol and insoluble in ether, and is chemically the sodium salt of 4-oxy-mercuri-3-nitro-2-cresol. It has the following structural formula:

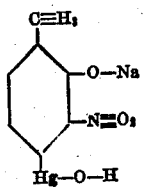

It will be observed that the example of my new compound results from combining mercuric acetate with ortho nitro ortho cresol and in that derivative the nitro group is in the second position relatively to the hydroxyl.

Having thus described my invention, I claim:

1. A new product represented by the formula

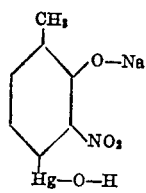

which crystallizes in long prisms, is reddish brown in color, soluble in hot water and in methyl alcohol and insoluble in ether.

2. The process, which comprises boiling an aqueous solution of mono-nitro-ortho-cresol with an aqueous solution of mercuric acetate acidulated with acetic acid.

3. The process, which comprises reacting on ortho-nitro-cresol with mercuric acetate, and precipitating acet-oxy-mercuri-nitro-ortho-cresol by an aqueous solution of an alkali metal hydroxide.

4. The process, which comprises reacting on ortho-nitro-cresol with mercuric acetate, and precipitating acet-oxy-mercuri-nitro-ortho-cresol by an aqueous solution of an alkali metal hydroxide, dissolving the resulting crystalline product in a hot aqueous solution of alkali-metal-hydroxide and cooling the solution to separate the alkali-metal-hydroxy-mercuri-mono-nitro-ortho cresol.

5. The process, which consists in preparing a boiling water solution of mono-nitro-ortho-cresol, adding thereto an aqueous solution of mercuric acetate and glacial acetic acid, boiling the mixture and adding a solution of sodium hydroxide to leave slight acidity, then crystallizing and separating the resultant product.

In testimony whereof, I have hereunto affixed my signature this 11th day of May A. D. 1923.

GEORGE W. RAIZISS.